March 8, 1938.  H. B. RUDD  2,110,511
MECHANISM FOR BREAKING THE FROZEN CONNECTIONS OF ICE CUBES
Filed Oct. 11, 1935  2 Sheets-Sheet 1
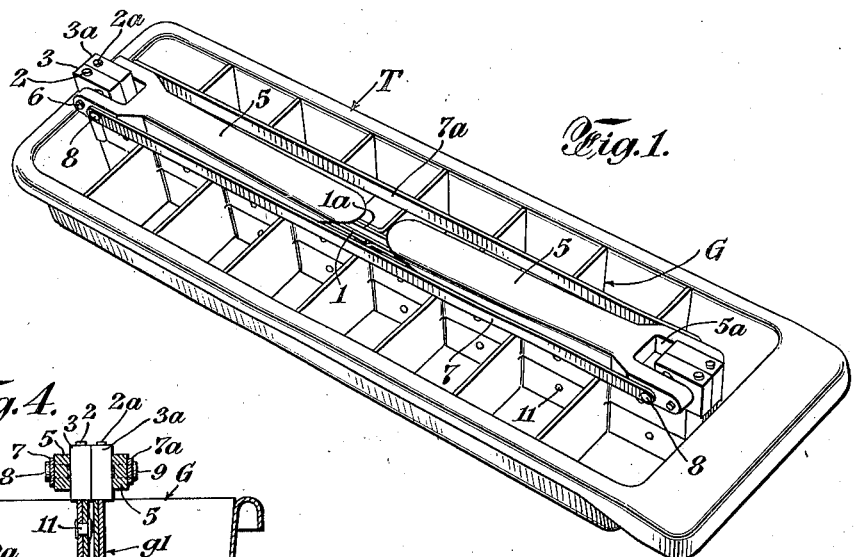
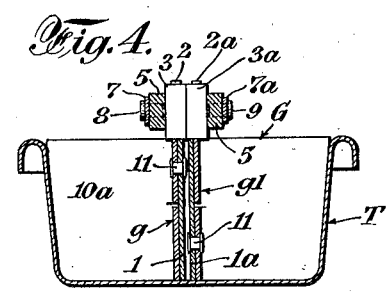
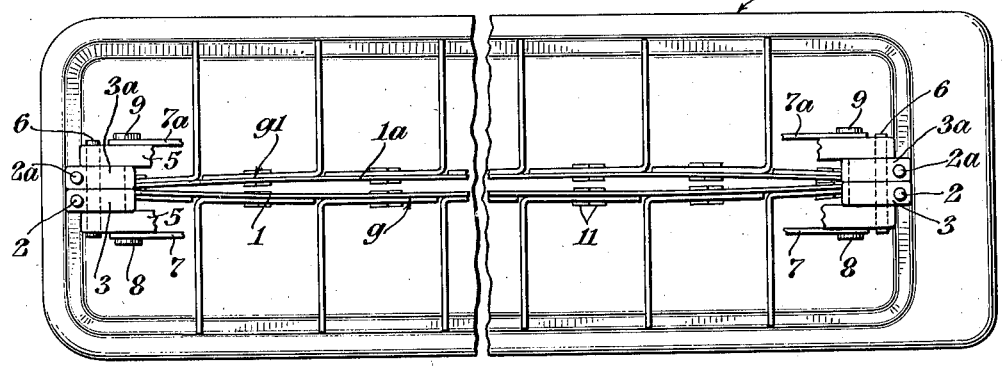
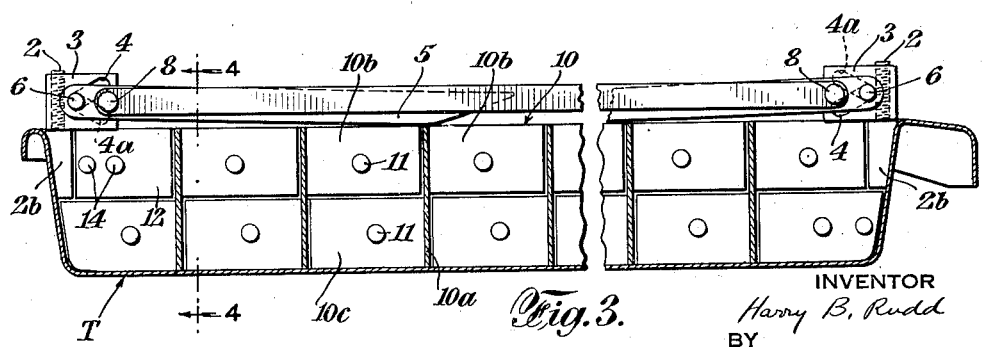
INVENTOR
Harry B. Rudd
BY
Ward, Crosby & Neal
ATTORNEYS March 8, 1938. H. B. RUDD 2,110,511
MECHANISM FOR BREAKING THE FROZEN CONNECTIONS OF ICE CUBES
Filed Oct. 11, 1935 2 Sheets-Sheet 2
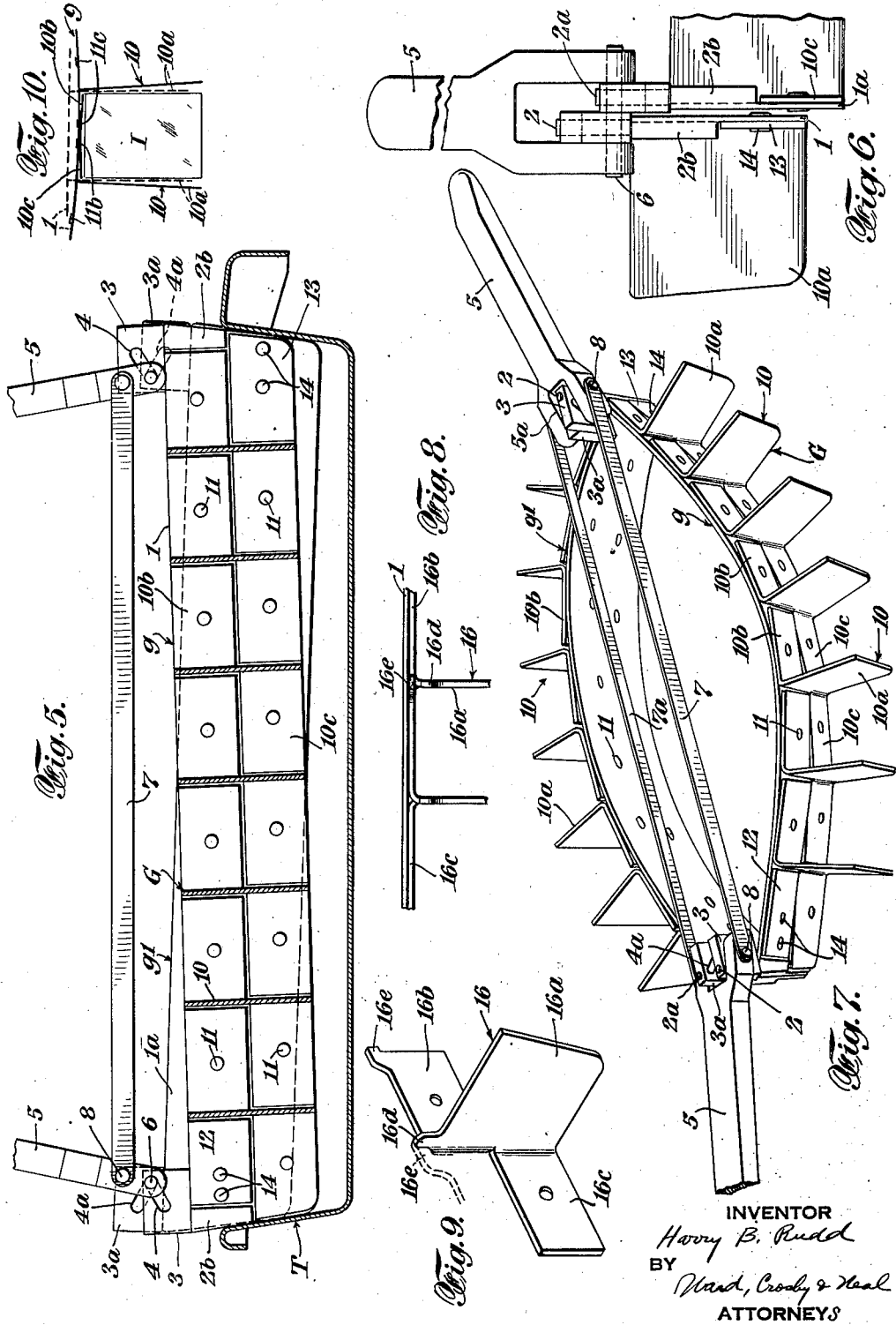
INVENTOR
Harry B. Rudd
BY
Ward, Crosby & Neal
ATTORNEYS Patented Mar. 8, 1938

2,110,511

UNITED STATES PATENT OFFICE 2,110,511

MECHANISM FOR BREAKING THE FROZEN CONNECTIONS OF ICE CUBES

Harry B. Rudd, Flushing, N. Y.

Application October 11, 1935, Serial No. 44,478

13 Claims. (Cl. 62—108.5)

My invention relates to mechanism for breaking the frozen connections which hold ice cubes in engagement with adjacent surfaces of a grid arrangement and/or the tray in which said grid arrangement is received.

My invention has particular reference to a grid arrangement comprising mechanism operable with ease and in an efficient manner to break the frozen connections holding ice cubes to adjacent surfaces forming the compartments for the water from which said ice cubes are formed.

Various other objects, advantages and characteristics of my invention will become apparent from the following description.

My invention resides in the manually operable mechanism, grid arrangements, combinations and features of the character hereinafter described and claimed.

For an understanding of my invention and for an illustration of one of the many forms thereof, reference is to be had to the accompanying drawings, in which:

Figure 1 is a perspective view of a tray and its associated grid arrangement all as constructed in accordance with my invention;

Fig. 2 is a plan view, with parts omitted, of the device shown in Fig. 1;

Fig. 3 is a longitudinal vertical sectional view, partly in elevation, of the device shown in Fig. 2;

Fig. 4 is a transverse, vertical sectional view, partly in elevation, and is taken on the line 4—4 of Fig. 3 looking in the direction of the arrows;

Fig. 5 is a longitudinal, vertical sectional view, partly in elevation, showing my novel device as it appears while operating the mechanism to effect removal of the ice cubes;

Fig. 6 is a transverse end elevational view of my novel grid arrangement;

Fig. 7 is a perspective view illustrating my novel grid arrangement as it appears at the conclusion of the final operation;

Fig. 8 is a fragmentary plan view illustrating a modification of the invention;

Fig. 9 is a perspective view showing a modified grid member as constructed in accordance with one form of my invention; and Fig. 10 is an exaggerated diagrammatic plan view illustrating the operation of the invention.

Referring to the drawings, T represents a sheet metal tray, container, or the like such, for example, as of the type with which a suitable grid may be associated so that ice cubes may be formed after the compartments of said tray or container has been filled with water and said tray or container inserted in the refrigerating compartment of a modern electrical or gas refrigerator, or equivalent. In accordance with my invention, a grid arrangement G of novel construction and operation is detachably associated with the tray T so that by operation of said grid arrangement, the ice cubes—either true cubes or "cubes" in which some faces have greater area than other faces—may readily be detached from those surfaces to which the ice adheres as a result of the freezing operation.

In the form of the invention herein shown, the aforesaid grid arrangement G comprises a grid structure $g$ formed from a strap-like supporting member $I$ terminating at each end in a section $2b$ either formed integrally with said member $I$ or fixed thereto, each section $2b$ having an upstanding post $2$ fixed thereto and each post $2$ having a disk-like member $3$ rotatably secured thereto. As clearly appears from a consideration of Fig. 3, each member $3$ is formed with a slot $4$, these slots being inclined in the same direction approximately at an angle of 30 degrees with respect to a horizontal line when the parts are in normal horizontal position as shown in said Fig. 3, and the slot $4$ at the left of Fig. 3 being at a higher level than the slot $4$ at the right of said Fig. 3.

Further, as clearly appears from the drawing, the grid arrangement G comprises a second grid structure $g1$ which, preferably, is a duplicate or substantially so, of the grid structure $g$. Accordingly, the parts of the grid structure $g1$, with the exception of the section $2b$, have been given the same reference characters as are applied to the corresponding parts of the grid structure $g$ with the numeral "$a$" added in each instance.

As clearly appears from a consideration of Figs. 1, 2 and 4, the grid structures $g$ and $g1$ are adapted to be disposed in side-by-side relation and, when thus disposed, the two sets of disk members $3$, $3a$ and $3$, $3a$ are immediately adjacent each other at opposite, respective ends of the grid arrangement G. Further, as appears from Fig. 3, the slots $4a$ of the respective members $3a$ are inclined in the same direction approximately at an angle of 30 degrees with respect to a horizontal line when the parts are in normal horizontal position, and the slot $4a$ at the left of Fig. 3 being at a lower level than the slot $4a$ at the right of said Fig. 3. However, as shown, the slots $4$ face toward the right whereas the slots $4a$ face toward the left, Fig. 3, and it results, therefore, that the slots of each pair of slots are diagonally related.

In the form of the invention herein shown, a lever 5 is adapted to be pivotally associated with each set of the disk members 3, 3a and, to this end, one end of each of the levers 5 is bifurcated as at 5a to form a passage for the reception of a set of the disk members 3, 3a, the bifurcated end of each lever 5 carrying a pin 6 which extends transversely through the adjacent set of slots 4, 4a.

In order that the levers 5 may be operated in the manner hereinafter described, they are connected together by a link arrangement which may be constituted, for example, by a pair of link members 7, 7a, the link member 7 having opposite ends thereof pivoted to the respective levers 5 as at 8, and the link member 7a having its opposite ends pivoted to the levers 5, respectively, as at 9. As clearly appears, the pivots 8 and 9 on each lever 5 are disposed in alinement transversely of said lever 5 and each pivot arrangement 8, 9 is spaced a short distance from the adjacent pivot pin 6.

Each of the above described members 1, 1a of the respective grid structures g, g1 serves as a support for suitable grid means, such as a plurality of grid members 10 which cooperate with each other, and with the bottom and side walls of the tray T in order to form the compartments in which the respective ice cubes are frozen. The shape and function of the members 10 are of importance in connection with the successful operation of my invention as hereinafter described in detail.

Thus, as shown on the drawings, each grid member 10 comprises a section 10a which is disposed laterally of its supporting member 1 or 1a as the case may be and, further, each grid member 10 may comprise upper and lower oppositely extending wing sections or "kicker" members 10b and 10c having substantially the same length and height, and such wing section height being approximately one-half that of the associated lateral section 10a. Further and of importance, the wing sections 10b, 10c of each grid member 10 should be disposed in the same plane and this plane should be at right angles to the plane of the lateral section 10a of said last named member 10. Still further, in accordance with the invention, the grid members 10 should be formed from stiff sheet metal incapable of flexing or bending under the influences of stresses ordinarily encountered in apparatus of the character described.

As stated above, the members 1, 1a serve as supports for the herein described grid members 10. To this end, in the example shown, the wing sections 10b, 10c of each grid member 10 are suitably secured, as by the respective rivets 11, to the supporting member 1 or 1a as the case may be. The resultant arrangement, as clearly appears from a consideration of the parts as positioned in Figs. 3 and 5, involves the vertical disposition of the wing section 10b of one grid member 10 above the wing section 10c of that grid member 10 next to the right. Further, as illustrated, the sections 10a of the respective grid members 10 extend laterally from the adjacent supporting member in equi-distant, spaced relation.

As appears from a consideration of Figs. 3, 5 and 7, it necessarily follows, with a construction of the character described, that a wing section 10b is missing from one end of each grid structure and that a wing section 10c is missing from the other end of said grid structures. In accordance with the invention, the space of the missing wing section 10b is occupied by a filler plate 12 while the space of the missing wing section 10c is occupied by a filler plate 13, these filler plates being secured to the supporting member 1a or 1b by the respective rivets 14, or equivalent, and said filler plates being constructed of material corresponding with the material of the grid members 10.

The operation is as follows:

With the grid arrangement G disposed within the tray T as illustrated in Fig. 1, the bottom surfaces of the supporting members 1, 1a and the grid members 10 are brought into close engagement with the bottom wall of said tray T. Thereupon, the tray T, in each of the compartments formed by the grid members 10, is filled with water nearly to the level of the upper tray surface and then the device as thus filled is inserted in the freezing compartment of a refrigerator. At any time after the freezing operation has been completed, the device may be withdrawn from the refrigerator and the ice cubes removed therefrom in the following manner.

During the freezing operation, the levers 5 are positioned as shown in Fig. 1. As the first step to be performed when removing the ice cubes, the operator grasps one lever 5 with one hand and the other lever 5 with the other hand, and swings said levers to the respective positions shown in Fig. 5. In so doing, the operator breaks the frozen connection which, by the freezing operation, was established between each ice cube and the adjacent side and bottom surfaces of the tray T. As a result, therefore, of the described movement of the levers 5, the adhesive contact between the tray walls (side and bottom) and all of the ice cubes is broken. Accordingly, the grid arrangement G with the ice cubes adhering thereto is readily removable from the tray T.

More particularly, the operation described generally above is effected in the following manner. As shown in Fig. 3, the pin 6 of each lever 5 is positioned at the rear of the adjacent set of slots 4, 4a and, when thus positioned, the levers 5 are in their horizontal non-operated positions as illustrated in Figs. 1 and 3. Furthermore, when the pins 6 are thus positioned, the supporting members 1, 1a and the sets of disks 3, 3a are in symmetrical side-by-side relation as shown in Figs. 1–3 inclusive. When the levers 5 are moved to vertical position as described above, said levers, in effect, pivot about the respective sets of pivots 8, 9, these pivots being spaced a constant distance apart by the link members 7, 7a. As a result, the pin 6 at the left of Fig. 3 moves toward the right in the adjacent slots 4, 4a and the pin 6 at the right of Fig. 3 moves toward the left in the adjacent slots 4, 4a. Due to this operation, the pins 6 take a position wherein they are moved toward each other to the entire extent permitted by the respective sets of slots 4, 4a as shown in Fig. 5. In so doing, the supporting members 1, 1a have been caused to move from their symmetrical position of Fig. 3 to the position in which they are angularly related to each other as shown in Fig. 5. The ice cubes, of course, are held at this time to the respective supporting members 1, 1a by the grid members 10 and it results, therefore, that the described movement of the supporting members 1, 1a causes the lower surfaces of the ice cubes to be progressively separated or "peeled" from the lower wall surface of the tray T. At the same time, by an action the same or akin to a shearing action, the outer surfaces of the respective ice cubes are separated from the adjacent side wall surfaces of the tray T. In this manner, the ice cubes, while remaining adhesively secured to or frozen to the grid sections 10a, 10b, and 10c of the grid members 10, are broken away from all adjacent surfaces of the tray T.

As stated above, when the parts of the grid arrangement G are positioned as shown in Fig. 5, the frozen connection between the ice cubes and the adjacent surfaces of the tray T has been broken. Thereupon, as the next step of the operation, the operator, while continuing to grasp the levers 5, elevates above the tray T the grid arrangement G together with the ice cubes adhering thereto. This feature of the invention is illustrated in Fig. 5 wherein the tray T is shown in one position which it takes when separating from the grid arrangement G and the ice cubes adhering thereto.

As the next step of the operation, the levers 5 are moved to the respective positions thereof shown in Fig. 7 whereby the supporting members 1, 1a are caused to take an elliptical configuration as illustrated in said Fig. 7. In so doing, the grid member sections 10a are so moved that they take a converging relation with respect to each other whereby the ice cubes are automatically detached from the grid member sections to which they have heretofore been united by a frozen connection.

More particularly, the operation described generally above is effected in the following manner. As stated, when the levers 5 have been moved to substantially vertical position as shown in Fig. 5 and as hereinbefore described, the pins 6 have moved toward each other to the extent permitted by the respective sets of slots 4, 4a. After the grid arrangement together with the adhering ice cubes have been separated from the tray T, the described movement of the levers 5 from the respective positions shown in Fig. 5 to those shown in Fig. 7 occurs in such manner that each lever 5 continues its pivotal movement about its associated set of pivots 8, 9. Before this continuing pivotal movement of the levers 5 was started, the pins 6 at the ends of the respective lever 5 had already moved toward each other to the extent permitted by the respective sets of slots 4, 4a. Therefore, such continuing pivotal movement of said levers 5 causes the two sets of members 3, 3a and 3, 3a to move toward each other in substantially symmetrical fashion. The posts 2, to which the supporting members 1, 1a are secured, are rotatable with respect to the respective members 3, 3a and, therefore, the described movement of the two sets of members 3, 3a toward each other causes the supporting members 1, 1a to be moved into substantially elliptical configuration as shown in Fig. 7.

When the supporting members 1, 1a are positioned within the tray T, they assume a slight bowed relation with respect to each other as shown in Fig. 2. Furthermore, at this time, the grid sections 10a are disposed substantially at right angles to their respective supporting members and necessarily, therefore, said grid sections 10a are substantially in parallel relation with respect to each other as illustrated in Fig. 2. It is while the parts just referred to are in and remain in the relation shown in Fig. 2 that the various compartments are nearly filled with water and the freezing operation proceeded with to completion. When the supporting members 1 or 1a are caused to take an arcuate configuration as described above, the parallel relation of the grid sections 10a is changed and, in so doing, the frozen connections of the ice cubes to the grid members are broken.

Referring particularly to Fig. 10, I have shown the positions taken by the various parts both before and after separation of an ice cube I from the grid structure g. In this view, side-by-side grid members 10 are shown, the respective wing members of one of these grid members being secured to the supporting member 1 by the rivets 11b, or equivalent, and the respective wing members of the adjacent grid member being secured to said supporting member by the rivets 11c, or the like.

The broken lines in Fig. 10 are representative of the normal freezing position of the ice cube I and associated parts. As shown by the broken lines, the member 1 is in normal straight-line relation, the grid sections 10a are substantially parallel with respect to each other, and, therefore, the ice cube is frozen to the adjacent metallic parts.

The full lines in Fig. 10 are representative of the normal releasing position of the parts referred to above. As illustrated by the full lines, the supporting member 1 has been moved to its arcuate position whereby the grid members have been caused to take different adjusted positions with respect to each other. Thus, the grid sections 10a shown in Fig. 10, in response to the arcuate configuration imparted to the supporting member 1 as noted above, have been caused to take a diverging relation with respect to each other. In so doing and in accordance with an important feature of the invention, the metallic surfaces of said grid sections 10a are separated or "peeled" from the respective adjacent surfaces of the ice cube I, this action occurring first at the extreme end of said grid sections 10a and then progressively extending toward the grid sections 10b, 10c whereby the frozen connections between the ice cube and the grid sections 10a are broken.

Further in accordance with an important feature of the invention, the described movement of the supporting member 1 to arcuate configuration causes the grid sections 10b, 10c of the two adjacent grid members 10 to become angularly related as shown in Fig. 10. These grid sections 10b, 10c, by this action, are released from the rear surface of the ice cube I and, moreover, said action of the grid sections 10b, 10c may be termed a "kicking" action in that pressure is applied to the ice cube to thereby assist, if necessary, in the breaking of the frozen connection to the grid sections 10a.

While the movement of the supporting member 1 arcuately tends to break the frozen connections of the ice cubes as stated, the ejection is aided by the wing sections or kicker members 10b, 10c which extend longitudinally of the supporting member 1 and are adapted to form an angle therewith to assist in breaking the frozen connections.

From the foregoing, it follows that movement of the levers 5 to the respective positions shown in Fig. 7 causes the automatic discharge or release of the ice cubes from the grid arrangement G. This complete action requires but a moment and is performed with only slight effort on the part of the operator. The ice cubes fall away from the grid surfaces as a result of the described operation of the levers 5 and said ice cubes are immediately available for use as desired.

The described action of the grid sections 10b, 10c on any ice cube 1 is important. In practice, it has been determined that the rivets 11, Fig. 5, preferably should be positioned in vertical alinement or substantially so. As shown in said Fig. 5, these rivets 11 are positioned on opposite sides of and very close to the vertical center line of adjacent grid sections 10b, 10c. This is a preferred arrangement but it is to be understood that the invention is not to be limited thereto because, obviously, the rivets 11 may be positioned otherwise than as described.

In Figs. 8 and 9, I have illustrated a modified form of grid member 16 which may be constructed of material corresponding with that of the grid members 10 and which, the same as any grid member 10, comprises a lateral section 16a and the upper and lower oppositely extending wing sections 16b, 16c. In the respects noted, the grid members 10 and 16 are duplicates. However, as shown, the grid member 16 further comprises the knob section 16d which projects above the upper surface of the section 16a and the actuating section 16e which projects above the upper surface and beyond the edge of section 16b. In accordance with the invention, two or more of the wing members 10 in the central areas of the supporting members 1, 1a may be replaced by a corresponding number of the grid members 16. When the latter are utilized, movement of the levers 5 from the Fig. 5 to the Fig. 7 position causes each actuating section 16e to engage a knob section 16d of the next adjacent grid member 16 before said movement of the levers 5 is completed. This action "locks" the grid members 16 and prevents further movement thereof with respect to each other and, accordingly, further bending to an arcuate form of the adjacent surfaces of the supporting members 1 (or 1a) is substantially prevented. It results, therefore, during continued movement of the levers 5 to the Fig. 7 position thereof, that the supporting members 1, 1a are caused to bend more in the end sections thereof than would be the case if some of the grid members 16 were not utilized as described. This additional bending of the supporting member end sections is desirable because increasing the movement of the grid members with respect to each other in the end section areas to thereby facilitate separation of the ice cubes associated with said last named grid members. At the same time, the decreased bending of the supporting member midsections does not interfere with satisfactory operation because said mid-sections tend to and do bend much more than is necessary to effect ice cube disengagement when the grid members 10 alone are used.

In Fig. 2, there is illustrated an important feature of the invention not heretofore discussed. Thus, as shown in said Fig. 2, the supporting members 1, 1a take a bowed configuration with respect to each other. In the example of the invention herein shown, this relation is attained by forming the supporting members 1, 1a of flexible sheet metal and then "setting" the supporting members 1, 1a before assembly thereof with the grid members so that said supporting members inherently take a bowed or arcuate form. Then, by properly assembling said supporting members with respect to each other, they inherently take the position shown in Fig. 2 provided, as is actually the case, that the central lateral grid sections 10a are slightly shorter than those grid sections 10a nearer and at the ends of the respective supporting members. It will be understood that, preferably, the supporting members 1, 1a are held under restraint by the tray T as the parts are shown in Fig. 2, the tray T preventing said supporting members from spreading to greater extent than as shown.

With an arrangement of the character described, it will readily be understood that entire removal of the grid arrangement G from the tray T permits the supporting members 1, 1a to assume their normal unrestrained positions. In other words, said supporting members 1, 1a, as soon as they are removed from the tray T, automatically move from each other and, to greater or less extent, take an arcuate form. This operation alone causes separation of many of the ice cubes from the grid arrangement and, in addition, imparts such configuration to the supporting members 1, 1a that they necessarily move in the proper direction and take a greater bowed relation when acted upon as the levers 5 are moved to their Fig. 7 positions.

Alternatively to the foregoing description hereinbefore stated concerning removal of the grid arrangement and its adhering ice cubes from the tray T, it shall be understood that the operator may grasp the levers 5 when the latter are positioned as shown in Fig 3. The combined arrangement may now be elevated and, while so held, the levers 5 may be moved to the position thereof shown in Fig. 5 to break the frozen connection previously established between the ice cubes and the tray surfaces. Under such conditions of operation, the tray T drops from the grid arrangement and the ice cubes adhering thereto as soon as the levers 5 have been moved to said position of Fig. 5.

In accordance with an important characteristic of the invention, it is highly desirable that those surfaces of the tray T and the grid arrangement G with which the ice cubes engage shall be corrosion-resisting to great extent whereby the frozen connections established by the freezing operation are more readily broken. Thus, said surfaces may be produced or formed by polishing any corrosion-resisting metal such as Monel metal, stainless steel, aluminum, or the like. Alternatively, if desired, such surfaces may be produced by chromium-plating such metals as plain steel, hard brass, phosphor bronze or the like.

As soon as the grid arrangement G has been moved to the position thereof shown in Fig. 7, the ice cubes are released therefrom. Thereupon, the levers 5 may be returned to the respective positions indicated in Fig. 3 and, by holding the supporting members 1, 1a toward each other, the grid arrangement may be returned to its position within the tray T. Another supply of water may be furnished to the tray T whereupon the next freezing operation may be proceeded with.

In view of the foregoing, it clearly appears that, by my invention, one of the grid structures may be moved as a unit with respect to the adjacent grid structure and to the tray so as to break the frozen connections holding the ice cubes to the tray and without breaking the frozen connections which hold the ice cubes to said grid structure. After this grid structure is removed from the tray, it may readily be moved approximately into arcuate or concave-convex configuration. This action may be performed with ease by reason of the fact that the ice cubes adhere only to one side of said grid structure and, therefore, the side thereof which is free from ice cubes may easily be caused to take a concave configuration under the influence of manually applied pressure. The side of said grid structure which becomes convex, then, is the side thereof to which the ice cubes were frozen. When taking this convex configuration, the grid sections are caused to assume a diverging relation as specified with the result that the ice cubes are stripped therefrom.

While the invention has been described with respect to a certain particular preferred example which gives satisfactory results, it will be understood by those skilled in the art after understanding the invention, that various changes and modifications may be made without departing from the spirit and scope of the invention and it is intended therefore in the appended claims to cover all such changes and modifications.

What is claimed as new and desired to be secured by Letters Patent is:

1. A grid arrangement adapted to be inserted into a tray for the production of ice cubes, said grid arrangement comprising a pair of strap-like supporting members disposed in side-by-side relation, sets of grid sections extending laterally and in opposite directions from the respective supporting members, and means comprising a pair of levers operative, while said grid arrangement is within the tray, for moving said supporting members, each in its plane, to cause them to assume a tilted relation with respect to each other and to the tray so as to break the frozen connections of the ice cubes to the tray.

2. A grid arrangement adapted to be inserted into a tray for the production of ice cubes, said grid arrangement comprising a pair of strap-like supporting members disposed in side-by-side relation, sets of grid sections extending laterally and in opposite directions from the respective supporting members, and means comprising a pair of levers for moving said supporting members so as to form a structure of substantially elliptical configuration from which the grid sections extend in diverging relation.

3. A grid arrangement adapted to be inserted into a tray for the production of ice cubes, said grid arrangement comprising a pair of strap-like supporting members disposed in side-by-side relation, sets of grid sections extending laterally and in opposite directions from the respective supporting members, and a pair of operating levers, movement of said operating levers to a predetermined extent effecting movement of said supporting members, each in its plane, to cause them to assume a tilted relation with respect to each other, continued movement of said operating levers to a further predetermined extent effecting movement of said supporting members so as to form a structure of substantially elliptical configuration from which the grid sections extend in diverging relation.

4. In a grid arrangement adapted for the production of ice cubes, a supporting member disposed in an arcuate position, a pair of grid sections projecting from said supporting member in diverging relation, said grid sections having integral wing sections, respectively, projecting in opposite directions toward the respective grid sections, said wing sections being arranged in crossing relation at one side of said supporting member.

5. A grid arrangement adapted to be inserted into a tray for the production of ice cubes, said grid arrangement comprising a pair of supporting members disposed in side-by-side relation, sets of grid sections extending laterally from the respective supporting members, and means operative while said grid structures are within said tray for moving one of said supporting members, together with the grid sections carried thereby, to cause the last named supporting member to assume a tilted relation with respect to the other supporting member and to the tray so as to break the frozen connections which hold the ice cubes of the tilted supporting member to the tray.

6. A grid arrangement adapted to be inserted into a tray for the production of ice cubes, said grid arrangement comprising a pair of strap-like supporting members disposed in side-by-side relation, sets of grid sections extending laterally and in opposite directions from the respective supporting members, and means for moving said supporting members, each in its plane, to cause them to assume a tilted relation with respect to each other and to the tray so as to break the frozen connections of the ice cubes to the tray.

7. A grid arrangement adapted to be inserted into a tray for the production of ice cubes, said grid arrangement comprising a plurality of supporting members adapted to extend longitudinally of said tray, sets of grid sections projecting laterally and in opposite directions from the respective supporting members so as to form compartments within said tray, said supporting members being disposed in side-by-side relation and being disconnected from each other throughout at least substantially the entire length thereof to permit the supporting members to be readily moved into substantially arcuate configuration after they are removed from the tray, and means for breaking the frozen connections of the ice cubes to the tray while maintaining the frozen connections of said ice cubes to the grid arrangement, each supporting member, after removal from the tray, having ice cubes adhering only to one side thereof whereby it is readily movable into substantially arcuate configuration so that its grid sections are caused to assume a diverging relation with respect to each other and break the frozen connections holding the ice cubes to said grid sections.

8. In a grid arrangement adapted to be inserted into a tray for the production of ice cubes, a strap-like supporting member, and grid means associated therewith and comprising a set of grid sections extending laterally therefrom, one of said grid sections having a wing section projecting toward the adjacent grid section, said wing section being disposed tangentially with respect to said supporting member when the latter is held in arcuate position.

9. In a grid arrangement adapted to be inserted into a tray for the production of ice cubes, means defining a plurality of compartments extending longitudinally of the tray, said means comprising grid sections adapted to be moved into diverging relation after removal from the tray, and means extending transversely between each set of adjacent grid sections and adapted to eject the ice cubes from between the respective sets of adjacent grid sections as they are moved into diverging relation.

10. Means defining a compartment within a tray for the production of an ice cube, said means comprising spaced grid sections forming opposite walls of said compartment, a wall surface connecting said grid sections, and means for ejecting the ice cube from said compartment, said last-named means comprising separate wing sections formed integrally with the respective grid sections and movable with respect to said wall surface.

11. A grid arrangement adapted to be inserted into a tray for the production of ice cubes, said grid arrangement comprising grid structures adapted to be disposed longitudinally of said tray, each of said grid structures comprising a flexible member extending substantially from one end of said grid arrangement to the other end thereof and a set of grid sections extending laterally from and fixed to said flexible member, said grid sections forming compartment walls within said tray whereby the latter is divided into four corner compartments and a plurality of intermediate compartments disposed in rows extending between the respective sets of corner compartments, means for moving each grid structure as a unit with respect to the adjacent grid structure so as to break the frozen connections of the ice cubes to the tray while maintaining the frozen connections of said ice cubes to said grid structures respectively, each grid structure, after removal from the tray, having ice cubes adhering only to one side thereof whereby it is readily movable into substantially arcuate configuration so that its grid sections are caused to assume a diverging relation with respect to each other and break the frozen connections holding the ice cubes to said grid sections.

12. A grid arrangement adapted to be inserted into a tray for the production of ice cubes, said grid arrangement comprising grid structures adapted to be disposed longitudinally of said tray, each of said grid structures comprising a flexible member extending substantially from one end of said grid arrangement to the other end thereof and a set of grid sections extending laterally from and fixed to said flexible member, said grid sections forming compartment walls within said tray whereby the latter is divided into four corner compartments and a plurality of intermediate compartments disposed in rows extending between the respective sets of corner compartments, each grid structure, after release of the frozen connections of the ice cubes to the tray, being removable from the tray with the ice cubes adhering only to one side thereof, each grid structure thereafter being movable into substantially concave-convex configuration, the convex surface of said grid structure being the side to which the ice cubes adhere and the concave surface of said grid structure being the side thereof which is free from ice cubes, movement of each grid structure into substantially concave-convex configuration as specified causing the grid sections to assume a diverging relation with respect to each other and break the frozen connections holding the ice cubes to said grid sections.

13. In a grid arrangement adapted to be inserted into a tray for the production of ice cubes, means defining a plurality of compartments extending longitudinally of the tray, said means comprising a flexible member having projecting therefrom grid sections adapted to be moved into diverging relation with respect to each other after removal from the tray, portions associated with said flexible member and located between the grid sections and normally extending longitudinally of said flexible member and adapted to assume an angular relation with respect thereto when the flexible member is flexed to act as "kicker" members to assist in ejecting the ice cubes.

HARRY B. RUDD.